United States Patent [19]

Claucherty

[11] 4,166,653
[45] Sep. 4, 1979

[54] SIMULATED WIRE WHEEL TRIM

[75] Inventor: Robert E. Claucherty, Jackson, Mich.

[73] Assignee: Norris Industries, Inc., Ypsilanti, Mich.

[21] Appl. No.: 771,005

[22] Filed: Feb. 22, 1977

[51] Int. Cl.² .............................................. B60B 7/04
[52] U.S. Cl. ................................................ 301/37 SS
[58] Field of Search .............. 301/37 SS, 37 R, 37 P, 301/57, 62, 66, 78, 84; 29/159 A

[56] References Cited

U.S. PATENT DOCUMENTS

| | | | |
|---|---|---|---|
| D. 170,464 | 9/1953 | Jenkins, Jr. ................. | 301/33 SS X |
| 1,534,840 | 4/1925 | Coulombe ......................... | 301/66 X |
| 2,676,850 | 4/1954 | McLeod ........................... | 301/37 SS |
| 2,710,775 | 6/1955 | Buerger ........................... | 301/37 SS |
| 2,767,027 | 10/1956 | Horn ............................... | 301/37 SS |
| 2,847,252 | 8/1958 | Lyon ............................... | 301/37 SS |
| 3,145,062 | 8/1964 | Judd ............................... | 301/37 SS |
| 3,967,855 | 7/1976 | Johnson ........................... | 301/37 R |
| 3,977,728 | 8/1976 | Mitchell et al. ..................... | 301/66 |
| 4,009,911 | 3/1977 | Apczynski ......................... | 301/37 SS |

*Primary Examiner*—Robert J. Spar
*Assistant Examiner*—Charles A. Marmon
*Attorney, Agent, or Firm*—Harness, Dickey & Pierce

[57] ABSTRACT

This disclosure relates to a simulated wire wheel cover for use on vehicle wheels which provides four depths of spokes by the use of only two sets of spoke clusters. The first set of spoke clusters overlap side to side at their radially inner ends, each spoke cluster in the first set comprising two simulated spokes attached at their radially outer ends to a decorative base portion secured to an outer member or circular wheel cover base member, each of simulated spokes diverging from the decorative base portion to be attached at their radially inner ends by a connecting rib which enables the first set of spoke clusters to overlap. The second set of spoke clusters are angularly positioned in a criss-cross relationship around the wheel cover, each spoke cluster in the second set comprising two simulated spokes attached at their radially inner ends at axially spaced points to a base plate, each of the simulated spokes diverging from the base plate to be separately secured to the circular wheel cover base member at their radially outer ends. It is the overlapping, staggering and axial spacing of the simulated spokes that furnishes the extra depths of spokes. The wheel cover is easy to manufacture and assemble and adapts readily to the use of lightweight materials such as plastic.

25 Claims, 5 Drawing Figures

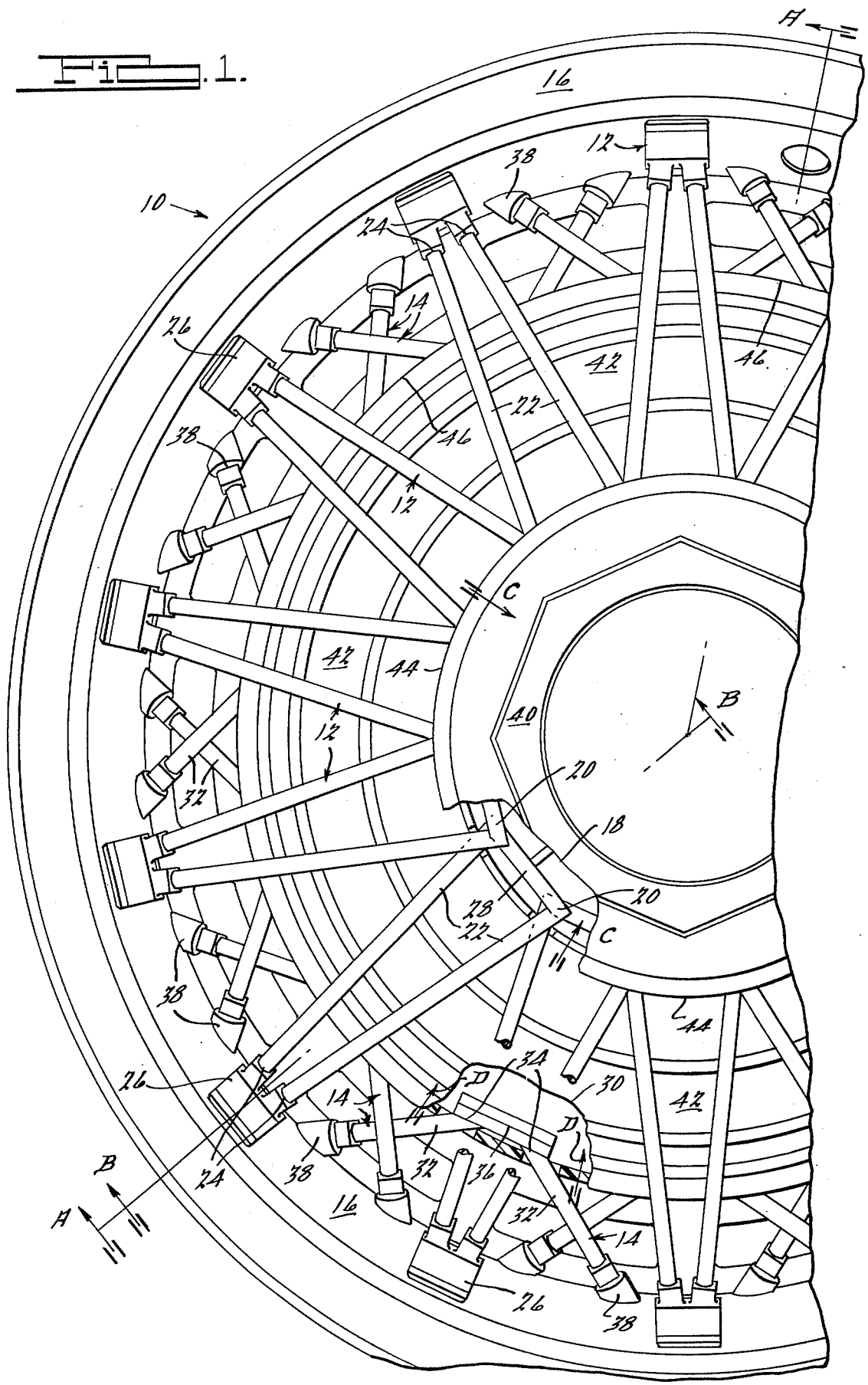

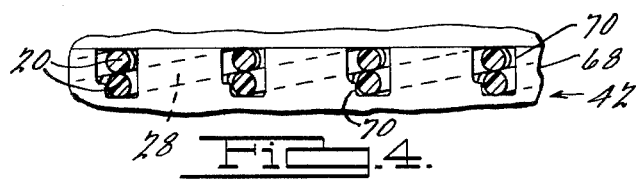
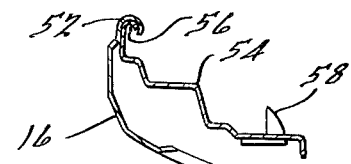
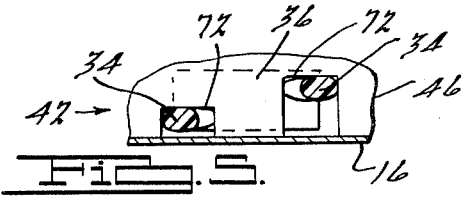
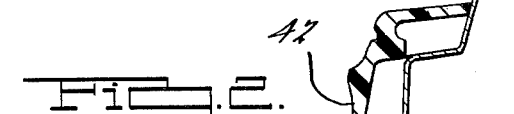
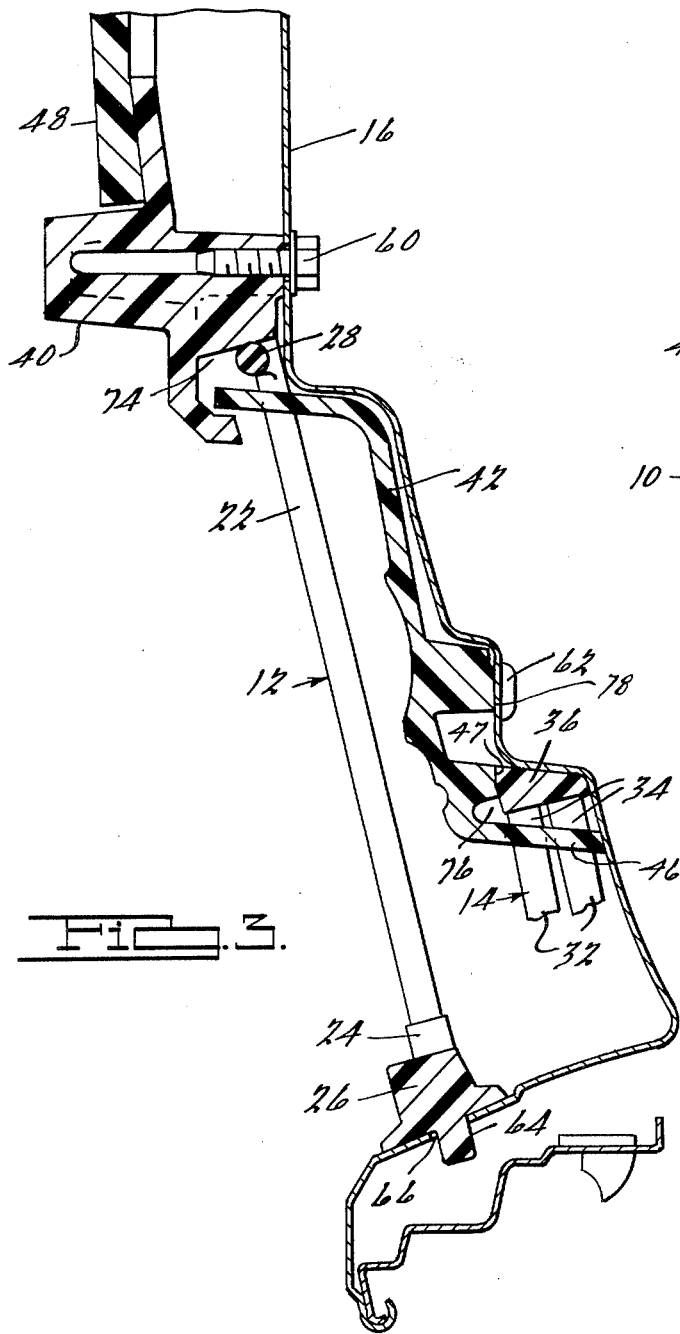
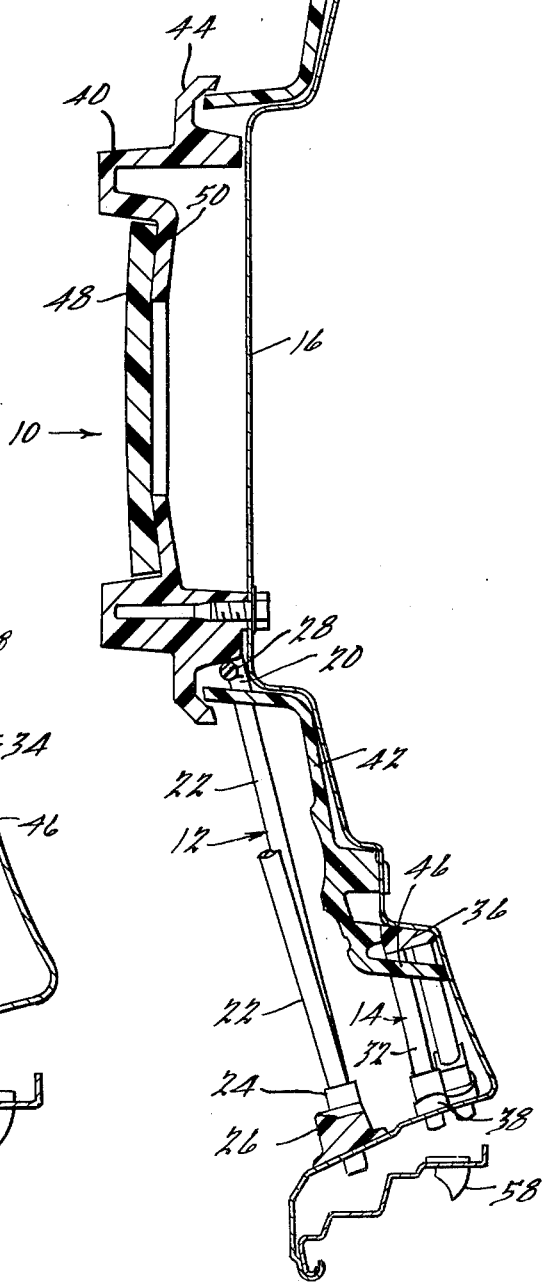

4,166,653

SIMULATED WIRE WHEEL TRIM

BACKGROUND OF THE INVENTION

I. Field of the Invention

The present invention pertains primarily to wheel trim for vehicle wheels, and more particularly to simulated wire wheel covers.

II. Description of the Prior Art

Generally, wire wheel covers for use on vehicle wheels can be regarded as an outgrowth of the actual wire wheels used on vehicles in the early days of the automobile. As vehicle weights and their potential speeds began to increase, the actual wire wheels had to be replaced by stronger stamped steel wheels. However, with such a replacement, a need developed for enhancing the appearance of vehicle wheels, and in addition to normal disc-type or ornamental wheel covers, many attempts were made to provide a simulated wire wheel cover which in effect feigned the appearance of actual wire wheels.

Many difficulties were encountered in an attempt to provide a wire wheel cover which would be authentic in appearance, provide satisfactory performance characteristics, and be reasonable in cost. Initial efforts consisted of separately fastening several spokes to both a center cap or hub member and an outer base member by the use of rather complex clamping arrangements and cumbersome metal fasteners. Since a substantial number of spokes were required to provide an authentic appearance, assembly of such a wheel cover became rather tedious and costly, and the final wheel cover provided a good amount of weight, an undesirable property in the eyes of present-day weight and energy conscious automotive designers.

Other efforts were aimed at reducing the rattling and other noise that resulted from wheel covers comprised of so many separate parts. Due to the rather rigorous performance environment and the severe operating stress and strain, various configurations were designed to overcome the shortcomings of prior art wheel covers. Some met with limited success, but in general, many had drawbacks such as lack of structural strength, inability to withstand environmental exposure, complexity and cost of manufacture and assembly, unappealing design, or excessive weight.

Although the concept of clamping at the radially inner ends of a first set of spoke clusters comprised of inwardly diverging spokes is known, as well as is the use of a second set of criss-crossed spoke clusters positioned below the first set, applicant believes that his invention presents several unique concepts and many advantages over such prior art.

It is a principal object of the present invention, therefore, to provide an improved simulated wire wheel cover.

It is a further object of the present invention to provide a simulated wire wheel cover that is simple in design, manufacture and assembly, yet presents an authentic, pleasing appearance, capable of enhancing the overall appearance of an automobile.

It is another object of the present invention to provide a simulated wire wheel cover that provides four depths of spokes by the use of only two sets of spoke clusters.

It is yet another object of the present invention to provide a simulated wire wheel cover which is readily adapted to be fabricated from relatively light weight materials, yet still provides substantial rigidity and excellent performance properties.

Other objects, features and advantages of the present invention will become apparent from the subsequent description and the appended claims taken in conjunction with the accompanying drawings.

SUMMARY OF THE INVENTION

In accordance with the present invention, a simulated wire wheel cover is provided which furnishes four depths of spokes by the use of only two sets of spoke clusters. The first set of spoke clusters overlap side to side at their radially inner ends in a manner similar to a collapsed line of dominoes. Each spoke cluster in said first set comprises two simulated spokes attached at their radially outer ends to a decorative base portion secured to an outer member or circular wheel cover base member, each of said simulated spokes diverging from said decorative base portion to be attached at their radially inner ends by a connecting rib which enables said first set of spoke clusters to overlap. The second set of spoke clusters are angularly positioned in a criss-cross relationship around the wheel cover, each spoke cluster in said second set comprising two simulated spokes attached at their radially inner ends at axially spaced points to a base plate. Each of said simulated spokes in said second set of spoke clusters diverge from said base plate to be separately secured to said circular wheel cover base member at their radially outer ends. It is the overlapping, staggering and axial spacing of the simulated spokes that furnishes the extra depths of spokes.

BRIEF DESCRIPTION OF THE DRAWINGS

The foregoing objects and others will in part be apparent and in part pointed out more fully hereinafter in conjunction with the description of the preferred embodiment of the present invention illustrated in the accompanying drawings and in which:

FIG. 1 is a view of a portion of a simulated wire wheel cover in accordance with the present invention as viewed when looking in an axially inward direction and having portions thereof partially broken away;

FIG. 2 is a sectional view of a preferred embodiment of a present invention, taken along the line A—A;

FIG. 3 is an enlarged sectional view of a portion of a preferred embodiment of a present invention, taken along the line B—B;

FIG. 4 is an edge view of a radially inner portion of the hub ring member of the present invention showing sections of the first set of spoke clusters, taken along the line C—C; and FIG. 5 is an edge view of a radially outer portion of the hub ring member of the present invention showing sections of the second set of spoke clusters, taken along the line D—D.

DESCRIPTION OF THE PREFERRED EMBODIMENT

Referring now to the drawings, wherein the showings are for the purpose of illustrating a preferred embodiment only and are not for the purpose of limiting the invention, FIG. 1 shows a portion of a simulated wire wheel cover 10 in which the first set of spoke clusters 12 and the second set of spoke clusters 14 are positioned relative to each other and relative to the outer element or circular wheel cover base member 16 so as to provide four depths of spokes. As most clearly shown at the broken away portion 18, the first set of spoke clusters 12 overlap side to side at their radially inner ends 20, each spoke cluster 12 in said first set comprising two generally radially extending simulated spokes 22 attached at their radially outer ends 24 to a decorative base portion 26 secured to said circular wheel cover base member 16. Each of said simulated spokes 22 in said first set of spoke clusters 12 diverge from said decorative base portion 26 to be attached at their radially inner ends 20 by a generally circumferentially extending connecting rib 28. This connecting rib 28 is most clearly depicted at the broken away portion 18. The radially inner ends 20 of each simulated spoke 22 are axially spaced such that the inner end 20 of one simulated spoke 22 is positioned below the inner end 20 of the adjacent simulated spoke 22 which overlaps it side to side in a manner similar to a collapsed stack of dominoes. In effect, one end of each said connecting rib 28 is partially disposed on top of the adjacent connecting rib, and the opposite end of each said connecting rib 28 is partially disposed beneath the adjacent connecting rib.

The second set of spoke clusters 14 are angularly positioned in a criss-cross relationship around the circular wheel cover base member 16. As best shown at the broken away portion 30, each spoke cluster 14 in said second set comprises two simulated spokes 32 attached at their radially inner ends 34 at axially spaced points to a base plate 36. Each of said simulated spokes 32 in said second set of spoke clusters 14 diverge from said base plate 36 to be separately secured to said circular wheel cover base member 16 at their radially outer ends 38. Said radially outer ends 38 are decorated to simulate the nut-type fasteners used with actual wire wheels. Due to the axial spacing of these simulated spokes 32, said spoke clusters 14 may be arranged so as to criss-cross each other around the wheel cover 10, thus further enhancing its appearance.

The portion of the simulated wire wheel cover 10 depicted in FIG. 1 is also comprised of a first inner element or center cap member 40 and a second inner element or hub ring member 42. The first set of spoke members 12 are arranged in an overlapping relationship around and beneath the circumference of the radially outer portion 44 of said center cap member 40, and are secured by clamping force exerted between said center cap member 40 and said circular wheel cover base member 16. The second set of spoke members 14 are angularly positioned around and beneath the circumference of the radially outer portion 46 of said hub ring member 42, and are secured by clamping force exerted between an abutment 47 of said hub ring member 42 and said wheel cover base member 16. FIGS. 2 and 3 depict these clamping arrangements in a clearer manner.

Referring now to FIG. 2, which is a sectional view of FIG. 1 taken along the line A—A, it should be noted that the upper half of this figure depicts a section without either of the spoke clusters shown. The center cap member 40 may be fabricated of zinc die casting or preferably plastic. It has been found that a styrene-modified polyphenylene oxide plastic such as General Electric Noryl performs well and furnishes excellent environmental exposure properties. Such a plastic is typically injection molded and must be of a quality to accept chrome plating. In the alternative, a plating grade quality of acrilonitrile butadiene styrene (ABS) plastic may be used. The hub ring member 42 is fabricated of the same material as center cap member 40 and is also chrome plated. In order to further enhance the appearance of the simulated wire wheel cover 10 and/or to identify the manufacturer of the automobile on which said wheel cover 10 is used, a medallion 48 may be inserted into the axial portion of the center cap member 40. The medallion 48 may be fabricated of acrylic plastic resin or the like and may be fastened to the center cap member 40 along ridge 50 by means of silicone rubber adhesive or the like, such as GENERAL ELECTRIC RTV 108.

The circular wheel cover base member 16 may be fabricated of stainless or rustless steel or the like and is stamped to the configuration shown in FIG. 2. Parts of said circular wheel cover base member 16 may be painted or chrome plated to enhance appearance. The radially outermost portion 52 of said circular wheel cover base member 16 is attached to retention band 54 by means of a conventional crimp connection at point 56. Said retention band 54 may be fabricated of galvanized steel or the like and contains several teeth or spring clips 58 which may be riveted onto said retention band 54. In order to protect said spring clips 58 from corrosion, they may be processed through a phosphate coating system and painted. Any suitable type of spring clip may be used, although it has been found that the use of a four point spring clip retention system such as that in U.S. Pat. No. 3,037,816 to Mulhern furnishes excellent retention for this type of wheel cover.

Referring now to FIG. 3, a self-tapping screw type fastener 60 or the like may be used to fasten said center cap member 40 to said circular wheel cover base member 16. Eight such screws positioned around said center cap member 40 have been found to be adequate. Hub ring member 42 may be fastened to said circular wheel cover base member 16 by the use of spin stakes 62. Eight of such spin stakes located around said hub ring member 42 have been found to be adequate. Spin staking eliminates the use of additional fasteners in a location which is fairly well sandwiched in anyway and also eliminates any additional fastener weight since the stakes are molded into the back side of the hub ring member 42.

Both sets of spoke clusters, 12 and 14, may be fabricated of zinc die casting or plastic similar to that used on the center cap member 40 and hub ring member 42. They are also chrome plated. It should be noted that due to the rather substantial number of parts in this wheel cover, the use of plastic in place of zinc die cast furnishes rather dramatic weight reduction, a consideration very prominent in the minds of many weight and energy conscious automotive engineers. The decorative base portion 26 of the first set of spoke clusters 12 has a plug 64 extending from its radially outermost end. Said plug 64 is adapted to mate with a receiving hole in said circular wheel cover base member 16 at point 66. The second set of spoke clusters 14 are secured to said circular wheel cover base member 16 in a similar manner. Such plugs may either be along the axis of the simulated spokes 22 or 32, or may be slanted out of the line of axis to provide a tighter, surer fit, less susceptible to rattling or the like.

FIG. 4 shows an edge view of a radially inner portion 68 of hub ring member 42 in which the domino-like overlapping of the first set of spoke clusters 12 is well-depicted. The connecting ribs 28 are shown in hidden lines and can be seen to position the radially inner ends 20 of said simulated spokes 22 of said first set of spoke clusters 12 in two axially different parallel planes. The slots 70 in said hub ring member 42 are specially designed to receive and position said spoke members 12.

FIG. 5 shows an edge view of a radially outer portion 46 of hub member 42 in which the axial spacing of said simulated spokes 32 of said second set of spoke clusters 14 with respect to said base plate 36 is clearly shown. The radially inner ends 34 of said simulated spokes 32 intersect said base plate in two axially different parallel planes as shown by the specially designed slots 72 in said hub ring member 42.

By staggering and spacing the simulated spokes of each set of spoke clusters in four axially different parallel planes, four depths of spokes are provided. Due to the simplicity of design of each spoke cluster, each is assembled easily into the wheel cover. As shown most clearly in FIG. 3, two annular cavities 74 and 76 are provided in the bottom sides of said center cap member 40 and said hub ring member 42 respectively. These annular cavities 74 and 76 are specially adapted to receive each set of spoke clusters and also function to clamp the spoke clusters in place as described previously.

FIG. 3 also depicts the unique clamping arrangement used to secure the second plurality of spoke clusters 14. It should be noted that said second plurality of spoke clusters 14 are restrained against radial movement by opposed surfaces of said circular wheel cover base member 16, and are restrained against axial movement by abutment 47 on said hub ring member 42 and said circular wheel cover base member 16, respectively. The base plate 36 of each of said second plurality of spoke clusters 14 has a shape complimentary to the contacted portions of said hub ring member 42 and said circular wheel cover base member 16. The hub ring member 42 also contains stop members 78 which contact the circular wheel cover base member 16 and position said hub ring member 42. By the interaction of the complimentary shaping of the base plate 36 and the stop members 78, the second plurality of spoke clusters 14 are fully secured so as to prevent rattling and vibration, but yet not to create any stress in the spoke clusters.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a simulated wire wheel cover comprised of an inner element and an outer element, the improvement comprising:
    a plurality of integrally formed, identical spoke clusters extending between and secured by said inner element and said outer element, each of said spoke clusters comprised of two generally radially extending simulated spokes joined at their radially inner ends by a generally circumferentially extending connecting rib, one end of each said connecting rib being partially disposed on top of the adjacent connecting rib, and the opposite end of each said connecting rib being partially disposed beneath the adjacent connecting rib, whereby said clusters form two rows of spokes in axially spaced conical planes.

2. The simulated wire wheel cover of claim 1 wherein each spoke cluster in said plurality of spoke clusters is comprised of two simulated spokes which converge in a radially outward direction.

3. The simulated wire wheel cover of claim 1 wherein each spoke cluster in said plurality of spoke clusters comprises two simulated spokes joined at their radially outer ends to a base portion secured to said outer element.

4. In a simulated wire wheel cover comprised of a first radially inner element, a second radially inner element, and a radially outwardly extending element, the improvement comprising:
    a first plurality of integrally formed, identical spoke clusters extending between and secured by said first inner element and said outwardly extending element, each of said spoke clusters comprised of two generally radially extending simulated spokes joined at their radially inner ends by a generally circumferentially extending connecting rib, one end of said connecting rib being partially disposed on top of the adjacent connecting rib, and the opposite end of each said connecting rib being partially disposed beneath the adjacent connecting rib, whereby said clusters form two rows of spokes in axially spaced conical planes, said two simulated spokes also being joined at their radially outer ends to a base portion secured to said outwardly extending element;
    a second plurality of integrally formed identical spoke clusters extending between and secured by said second inner element and said outwardly extending element, each of said second spoke clusters comprised of two simulated spokes attached to a base plate at their radially inner ends at axially spaced points, thereby forming two rows of spokes in axially spaced conical planes, said base plate being secured between said second inner element and said outwardly extending element.

5. The simulated wire wheel cover of claim 4 wherein each spoke cluster in said first plurality of spoke clusters is comprised of two simulated spokes which converge in a radially outward direction.

6. The simulated wire wheel cover of claim 4, wherein each spoke cluster in said second plurality of spoke clusters is comprised of two simulated spokes which diverge in a radially outward direction and are separately secured to said outwardly extending element at their radially outer ends.

7. The simulated wire wheel cover of claim 4 wherein said outwardly extending element is provided with generally radially opposed spaced surfaces and said second plurality of spoke clusters are restrained against radial movement by said opposed surfaces of said outer element.

8. The simulated wire wheel cover of claim 4 wherein said second plurality of spoke clusters are restrained against axial movement by opposed surfaces of said second inner element and said outwardly extending element, respectively.

9. The simulated wire wheel cover of claim 4 wherein said base plate of each of said second plurality of spoke clusters has a shape complimentary to the contacted portion of said outwardly extending element.

10. The simulated wire wheel cover of claim 4 wherein said base plate of each of said second plurality of spoke clusters has a shape complimentary to the contacted portion of said second inner element.

11. The simulated wire wheel cover of claim 4 wherein said second inner element contains a stop member which positions said second inner element with respect to said outwardly extending element to thereby define a cavity for positioning and retaining the base plates of said second plurality of spoke clusters.

12. A simulated wire wheel cover comprising:
a center cap member;
a hub ring member, the radially inner portion of which engages the radially outer portion of said center cap member;
a circular wheel cover base member designed to support said center cap member and said hub ring member;
a retention band secured to the radially outer portion of said circular wheel cover base member, designed to retain said wheel cover on a vehicle wheel;
a first plurality of integrally formed, identical spoke clusters extending between the radially outer portion of said center cap member and the radially outer portion of said circular wheel cover base member, each of said spoke clusters comprised of two generally radially extending simulated spokes joined at their radially inner ends by a generally circumferentially extending connecting rib, one end of each said connecting rib being partially disposed on top of the adjacent connecting rib, and the opposite end of each said connecting rib being partially disposed beneath the adjacent connecting rib, around the circumference of the radially outer portion of said center cap member and clamped in position by said center cap member, whereby said clusters form two rows of spokes in axially spaced conical planes, each of said simulated spokes converging in a radially outward direction and joined at their radially outer ends to a decorative base portion secured to said circular wheel cover base member;
a second plurality of integrally formed, identical spoke clusters extending in criss-cross relationship between the radially outer portion of said hub ring member and the radially outer portion of said circular wheel cover base member, said second spoke clusters being equally spaced around the circumference of the radially outer portion of said hub ring member and clamped in position by said hub ring member, each spoke cluster in said second plurality of spoke clusters comprising two simulated spokes attached to a base plate at their radially inner ends at axially spaced points, thereby forming two rows of spokes in axially spaced conical planes, said base plate being secured by a clamping force exerted between the radially outer portion of said hub ring member and said circular wheel cover base member, each of said simulated spokes diverging from said base plate in a radially outward direction, and separately secured to said circular wheel cover base member at their radially outer ends;
a first set of fastening means securing said center cap member to said circular wheel cover base member; and a second set of fastening means securing said hub ring member to said circular wheel cover base member.

13. The simulated wire wheel cover of claim 12 wherein said center cap member contains an annular cavity beneath its radially outer portion adapted to receive and secure by clamping force the radially inner ends of said first plurality of spoke clusters.

14. The simulated wire wheel cover of claim 12 wherein said hub ring member contains an annular cavity beneath its radially outer portion adapted to receive and secure by clamping force the radially inner ends of said second plurality of spoke clusters.

15. The simulated wire wheel cover of claim 12 wherein said hub ring member also contains equally spaced slots around the circumference of its radially inner portion, said slots being adapted to receive the radially inner ends of said first plurality of spoke clusters.

16. The simulated wire wheel cover of claim 12 wherein said hub ring member also contains equally spaced slots around the circumference of its radially outer portion, said slots being adapted to receive the radially inner ends of said second plurality of spoke clusters.

17. The simulated wire wheel cover of claim 12 wherein said circular wheel cover base member contains two sets of equally spaced holes around its radially outer portion, said holes being adapted to receive the radially outer ends of both of said first set of spoke clusters and said second set of spoke clusters.

18. The simulated wire wheel cover of claim 12 wherein said first set of fastening means securing said center cap member to said circular wheel cover base member comprises self-tapping screws.

19. The simulated wire wheel cover of claim 12 wherein said second set of fastening means securing said hub ring member to said circular wheel cover base member comprises spin stakes.

20. The simulated wire wheel cover of claim 12 wherein said center cap member is made of plastic.

21. The simulated wire wheel cover of claim 12 wherein said hub ring member is made of plastic.

22. The simulated wire wheel cover of claim 12 wherein said first plurality of spoke clusters are made of plastic.

23. The simulated wire wheel cover of claim 12 wherein said second plurality of spoke clusters are made of plastic.

24. The simulated wire wheel cover of claim 12 wherein said center cap member is made of plastic, said hub ring member is made of plastic, and said circular wheel cover base member is made of metal.

25. The simulated wire wheel cover of claim 12 wherein said center cap member, said hub ring member, said first plurality of spoke clusters, and said second plurality of spoke clusters are all made of plastic, and said circular wheel cover base member is made of metal.

* * * * *

UNITED STATES PATENT AND TRADEMARK OFFICE
CERTIFICATE OF CORRECTION

PATENT NO. : 4,166,653

DATED : September 4, 1979

INVENTOR(S) : Robert E. Claucherty

It is certified that error appears in the above–identified patent and that said Letters Patent are hereby corrected as shown below:

Column 6, line 50 (Claim 7): "outer" should be —outwardly extending—

*Signed and Sealed this*

*Fourth* Day of *December 1979*

[SEAL]

*Attest:*

SIDNEY A. DIAMOND

*Attesting Officer*   *Commissioner of Patents and Trademarks*